Figure 14:
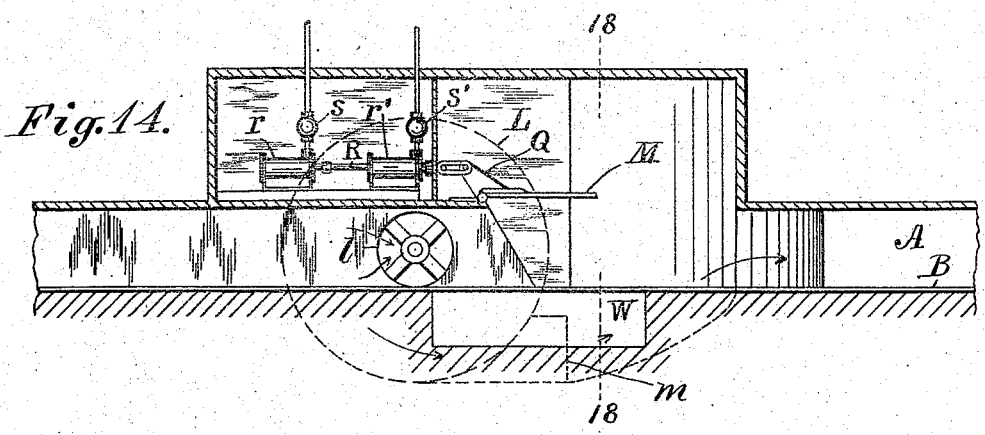

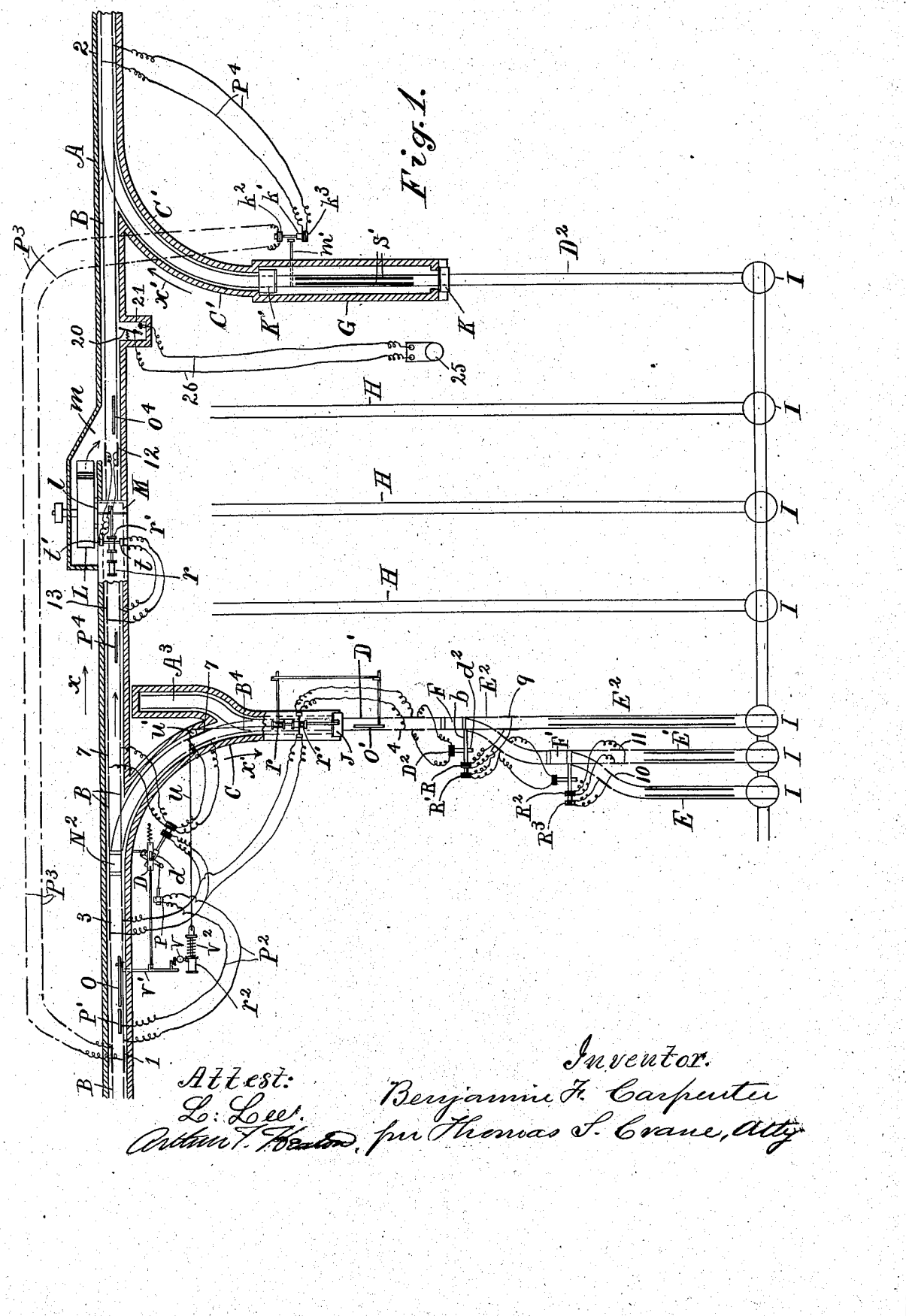

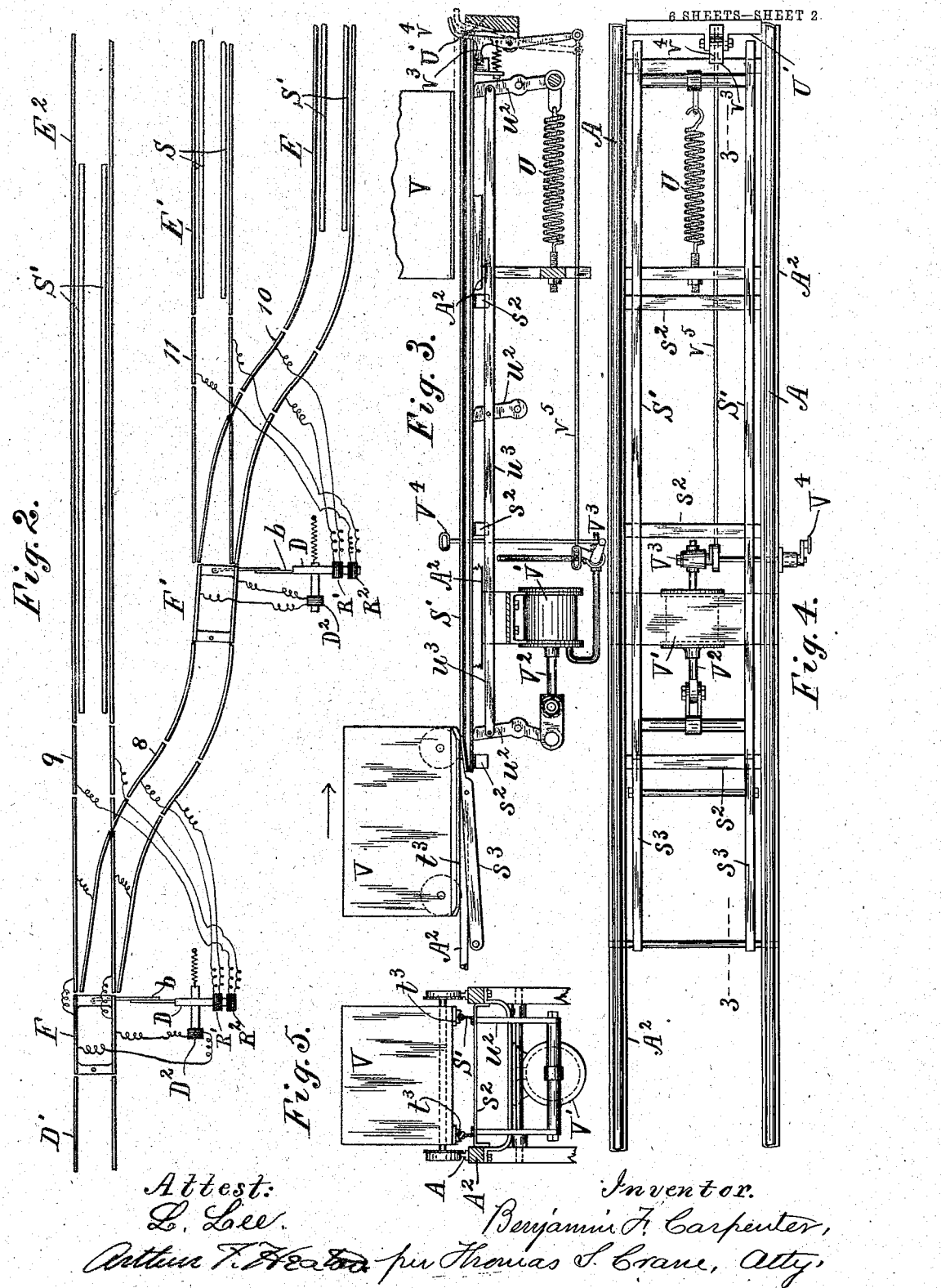

No. 815,320. PATENTED MAR. 13, 1906.
B. F. CARPENTER.
SAFEGUARD FOR AUTOMATIC RAILWAYS.
APPLICATION FILED MAY 12, 1904. RENEWED JULY 7, 1905.
6 SHEETS—SHEET 3.
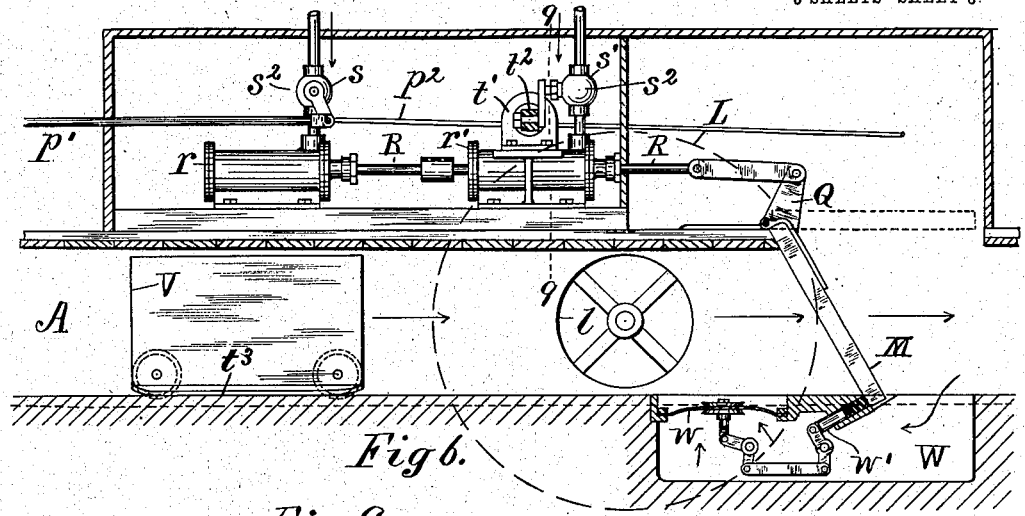
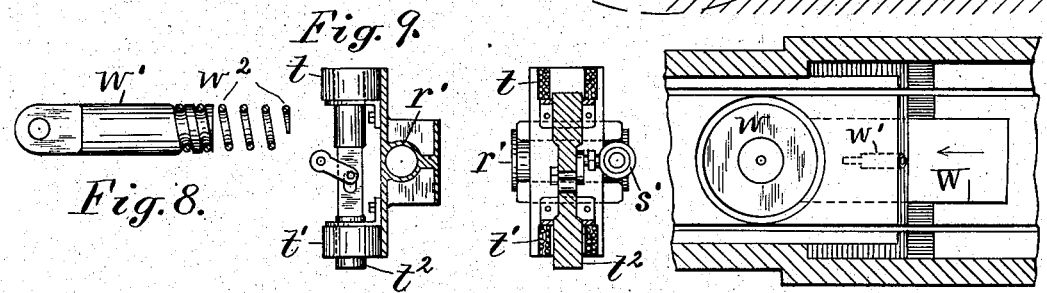
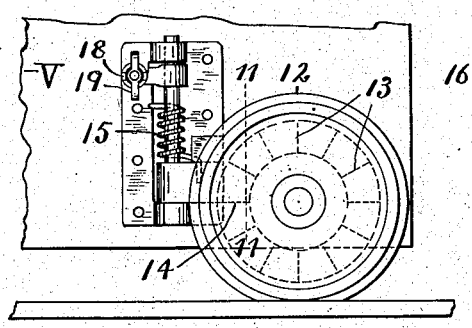
Attest:
L. Lee
Arthur F. Heaton
Inventor.
Benjamin F. Carpenter,
per Thomas S. Crane, Atty.

No. 815,320. PATENTED MAR. 13, 1906.
B. F. CARPENTER.
SAFEGUARD FOR AUTOMATIC RAILWAYS.
APPLICATION FILED MAY 12, 1904. RENEWED JULY 7, 1905.

6 SHEETS—SHEET 4.

Attest:
L. Lee.
Arthur F. Heaton.

Benjamin F. Carpenter,
Inventor.
per Thomas S. Crane, Atty.

No. 815,320. PATENTED MAR. 13, 1906.
B. F. CARPENTER.
SAFEGUARD FOR AUTOMATIC RAILWAYS.
APPLICATION FILED MAY 12, 1904. RENEWED JULY 7, 1905.
6 SHEETS—SHEET 5.
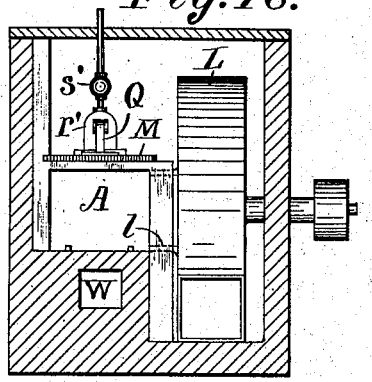
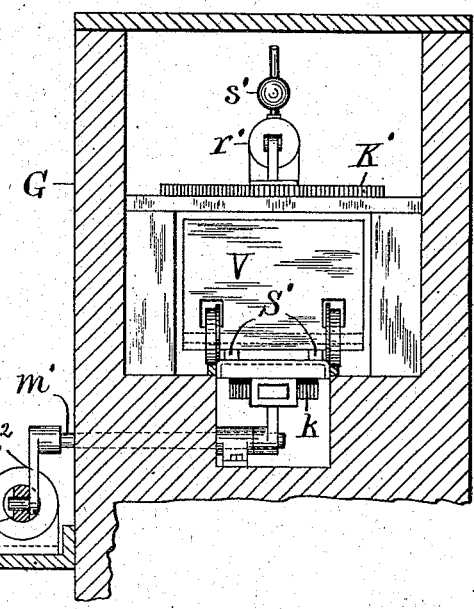
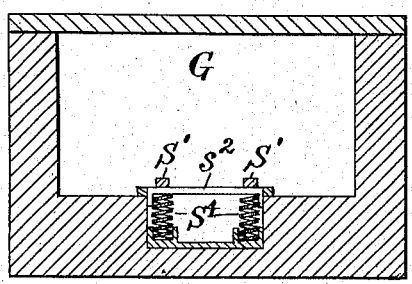
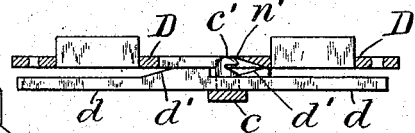
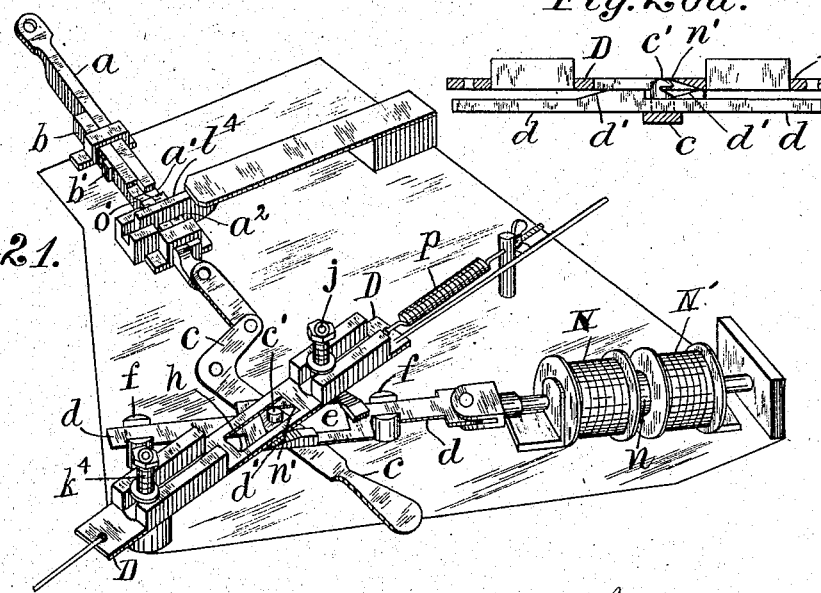
Attest:
L. Lee.
Arthur F. Haston.
Inventor.
Benjamin F. Carpenter
per Thomas S. Crane, Atty.

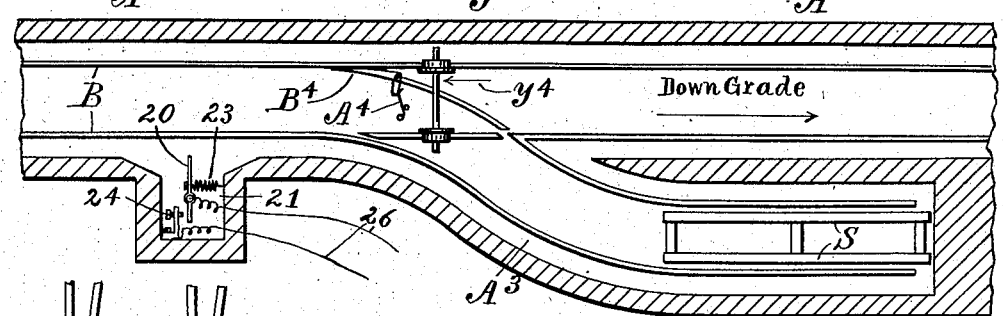
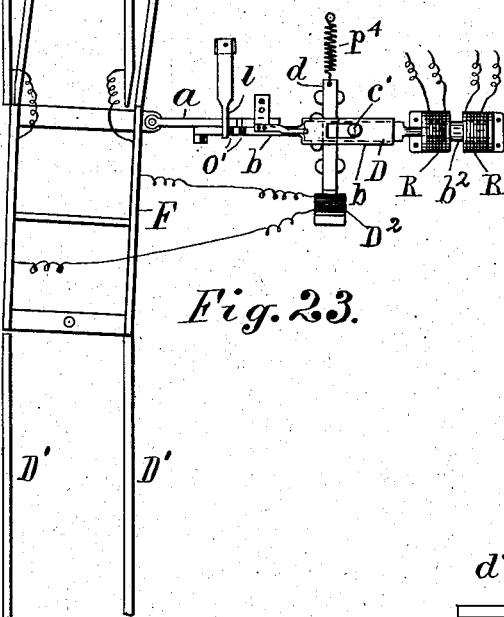
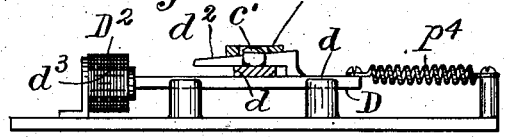
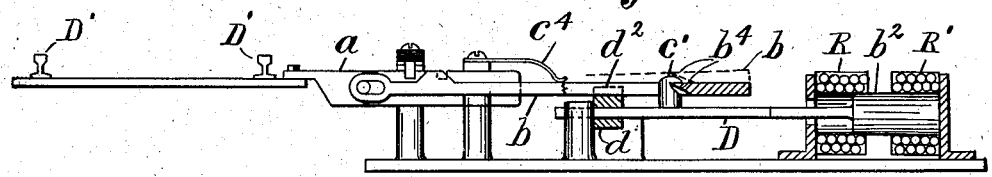

UNITED STATES PATENT OFFICE.

BENJAMIN F. CARPENTER, OF ROSELLE PARK, NEW JERSEY.

SAFEGUARD FOR AUTOMATIC RAILWAYS.

No. 815,320.

Specification of Letters Patent.

Patented March 13, 1906.

Application filed May 12, 1904. Renewed July 7, 1905. Serial No. 268,735.

*To all whom it may concern:*

Be it known that I, BENJAMIN F. CARPENTER, a citizen of the United States, residing at 132 Chestnut street, Roselle Park, county of Union, State of New Jersey, have invented certain new and useful Improvements in Safeguards for Automatic Railways, fully described and represented in the following specification and the accompanying drawings, forming a part of the same.

The present invention furnishes various safeguards for use in automatic railways in which cars are propelled upon rails through a tunnel or pneumatic tube by a suitable motor agent and without any attendant. In such an automatic railway a branch track may be run through a branch tunnel into an open station and cars loaded and unloaded in such station and then despatched by another branch track into the main tunnel. The invention furnishes means for safely switching the cars automatically into the station, for arresting the cars when in the station, and for preventing the despatch of cars to the main track when the same is obstructed by a passing car. One of the safeguards comprises two shifter devices applied to a gate or door upon the tunnel, to a rail-switch or signal apparatus, or to any other movable appliance upon the railway and means actuated by the moving car when approaching such appliance to initiate the movement of each shifter separately. The operation of either shifter thereafter serves to move the appliance automatically, and the failure of either shifter is not sufficient to prevent the desired movement of the appliance. A further safeguard is provided by automatic mechanism to lock the appliance when moved and to hold the same locked while the car passes over a given section of the track, termed a "danger-section" herein. The lock serves to hold the appliance from displacement by any following cars until the section gate or switch has been fully passed by each and all of such cars. Any accident arising from the contact of a succeeding car with a partially-moved or interfering switch or door is thus avoided, and the lock thus operates to prevent such accidents. In connection with the lock for such moving appliances the invention furnishes a controller applied to the shifter, which operates under certain conditions to disengage the shifter from the appliance to be moved, so that any further movement of the appliance by such shifter is prevented until it is safe to again move the appliance, when the action of the controller is reversed by automatic means. In the operation of an automatic railway the cars would be normally despatched at suitable intervals to permit the safe operation of a switch or gate in connection with such car before the switch or gate required to be moved again for the succeeding car; but the present invention furnishes means for holding the switch or gate in the same position for the passage of a succeeding car if it approaches such switch or gate before the preceding car has left the danger-section.

The invention also includes so-called "accelerators," disposed at suitable intervals along the main tunnel to maintain the required air movement in the tunnel for propelling the cars, such accelerator including a suitable air-blower having its inlet and outlet connected with the tunnel at separate points and a gate, which serves as an "accelerator-valve," applied to the tunnel between such points to prevent the air from short-circuiting or moving from the outlet to the inlet of the blower. In connection with the accelerator the invention provides mechanism actuated by an approaching and receding car for automatically opening and closing the accelerator-gate. The gate may be arranged to open in either direction, but is preferably opened away from the approaching car, and is thus held closed by the air-pressure. The gate is normally closed, except to permit the passage of a car, and the accelerator thus operates normally to accelerate the motion of the air in the desired direction in the tunnel. A safety-pocket is provided to catch cars which become unsupported upon grades.

The invention will be understood by reference to the annexed drawings, in which—

Figure 15:
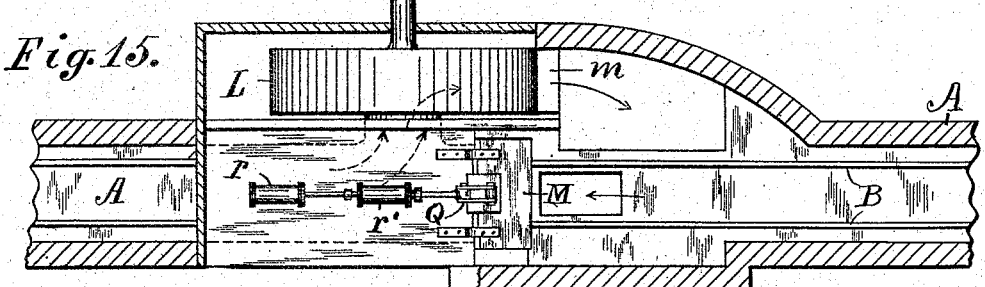
Figure 16:
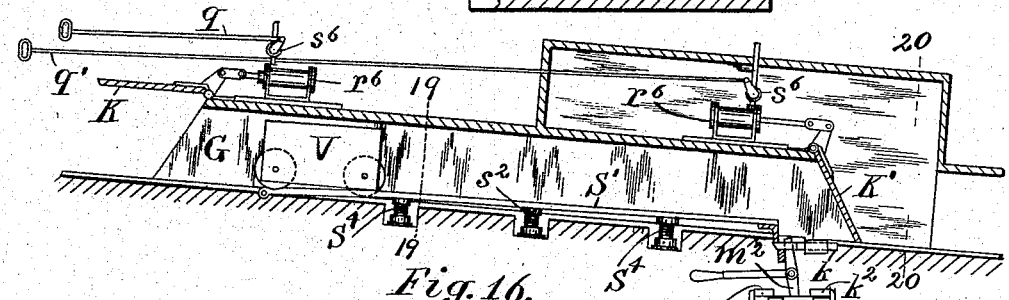
Figure 17:
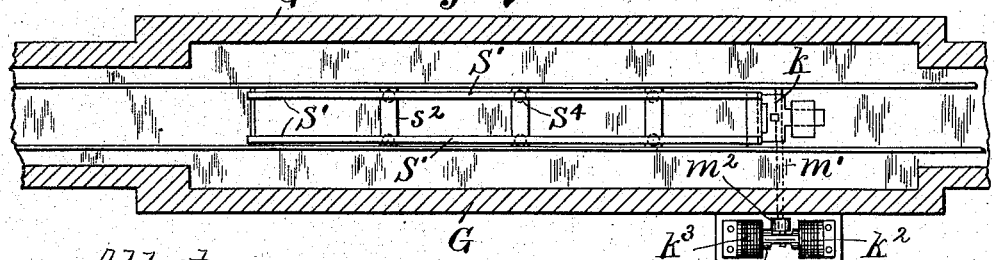

Figure 1 is a diagrammatic plan of a station, illustrating the invention. Fig. 2 is a plan of the arrester-tracks in the station. Fig. 3 is a longitudinal section of the arrester, taken on line 3 3 in Fig. 4. Fig. 4 is a plan of the arrester, and Fig. 5 an end view of the same, a car being shown in Figs. 3 and 5 in contact with the arrester. Fig. 6 is a section of a tunnel with a gate applied thereto and two shifter devices for moving the gate and a diaphragm operated by the air-pressure for counterbalancing the pressure upon the gate. Fig. 7 is a plan of the tunnel-floor, showing such diaphragm. Fig. 8 is an enlarged view of the spring-plunger moved by the diaphragm for pressing upon the gate. Fig. 9 is a cross-section on line 9 9 in Fig. 6, showing the solenoids for moving the pneumatic valve. Fig. 10 is a plan of one of the pneumatic shifter-cylinders and pneumatic valve with solenoids for moving the same, the solenoids and armature being shown in section at their center line. Fig. 11 shows one corner of the car in end view with the car-wheel in section and ratchet mechanism applied thereto. Fig. 12 is a side view of the car with ratchet device. Fig. 13 is a plan of the ratchet device, upon a larger scale, with one edge of the car-wheel shown in section as well as the bearing for the adjusting-bolt. Fig. 14 is a side elevation of the accelerator with the tunnel in section. Fig. 15 is a plan of the accelerator with the tunnel in section. Fig. 16 is a longitudinal section of the despatching-chamber. Fig. 17 is a horizontal section of the same, and Fig. 18 is a cross-section on line 18 18 in Fig. 14. Fig. 19 is a cross-section on line 19 19 in Fig. 16. Fig. 20 is a cross-section on line 20 20 in Fig. 16. Fig. 21 is a perspective view of the controller for the main-line switch. Fig. 22 is a sectional plan of the tunnel, showing a safety-pocket. Fig. 23 is a plan, upon a larger scale, of one of the controllers for the station branch tracks. Fig. 24 is an elevation of the guard-bar and solenoid with the draw-bar and shifter in section adjacent to the stud $c'$. Fig. 25 is an elevation of the device shown in Fig. 23 with the parts in section where hatched at the center line of the shifter.

In Fig. 1, A designates the wall of the main tunnel; B, the main track therein. C designates the outlet branch tunnel, and D' the receiving-track leading through the same into the station. C' designates the inlet branch tunnel, and $D^2$ the despatching-track therein. E, E', and $E^2$ are arrester-tracks connected with the receiving-track D' by switches F and F'. G designates the despatching-chamber upon the inlet-track $D^2$. H are tracks for loading and unloading, and I are turn-tables connecting the various tracks. J is a gate at the mouth of the outlet-tunnel C. K is a gate at the receiving end of the despatching-chamber G, and K' a gate at the discharging end of the same.

An accelerator is shown upon the main tunnel comprising a blower L, having inlet $l$ and outlet $m$ connected with the tunnel at adjacent points. Between such points a gate M is inserted in the tunnel and is provided with means for automatically opening and closing the same upon the approach and departure of a car. The accelerator will be described further in connection with Figs. 14 and 15.

The walls of the tunnels A, C, and C' are shown in section, except where the mechanism is provided for opening the gates J and M. The cars move to the right in the tunnel A, as shown by the arrow $x$, and into and out of the tunnels C and C', as indicated by arrows $x'$. A switch $N^2$ connects the track-rails B with the branch C, and a section of the rails, including the switch and extending from 1 to 2, (past the junction where the inlet $D^2$ enters,) forms a danger-section of the main track.

A section extending from 3 on the main track (preceding the switch $N^2$) to 4 on the branch track D' (beyond the outlet-gate J) forms a danger-section for cars passing into the station.

Two forms of double mechanism for actuating a switch or gate are shown herein, one for the switch $N^2$, consisting of a tread-lever O with rock-shaft $v'$ and connecting-rod to a shifter D for moving the switch mechanically and a solenoid P with a tread-lever P' in the track preceding the track-lever O for shifting the switch electrically.

The shifter is shown in Fig. 21 combined with the devices termed a "controller," which are described and claimed in my application, Serial No. 207,551, filed May 12, 1904. In such controller the lock-bar $a$ is attached to the switch and provided with notches $a'$ and $a^2$ to receive a spring-latch $l^4$. A draw-bar $b$ is connected by slot and bolt $b'$ to the lock-bar and provided with opposite inclines $o'$, adapted to lift the latch when moved in either direction. A lever $c$ is linked to the draw-bar and provided with stud $c'$, having a notch close to the top at one side, and the shifter D has a slot $h$ with knife-edge $n'$ at one end to engage the notch in the stud when the shifter is moved longitudinally, (toward the left in Fig. 21.) A spring $p$ serves to hold the shifter normally away from the stud. The shifter is guided upon pins $j$, having springs $k^4$, pressing it normally downward and holding the knife-edge $n'$ in line with the notch in the stud. A guard-bar $d$ is arranged in guides $f$ obliquely beneath the shifter D and provided with a slot $e$, and the guard-bar is fitted between the lever $c$ and the shifter and provided with wedged surfaces $d'$, which operate to lift the shifter with the knife-edge $n'$ clear from the stud $c'$ when the guard-bar is pushed forward, as shown in Fig. $20^a$. When the shifter is thus lifted, it may be reciprocated by its connections to the tread-lever O without producing any effect upon the stud $c'$ or upon the connected switch, the spring $p$ pulling the shifter back to its initial position (shown in Fig. 21) as soon as the car passes off of the tread-lever. In practice the tread-levers for different stations are arranged at different points in the width of the track and the cars are furnished upon one axle with an adjustable wheel, which may be set to press upon any tread-lever preceding the station to which the car is destined, and the wheel and tread-lever thus operate to switch the car to that station only.

To reciprocate the guard-bar, the solenoids N N' operate upon an armature $n$, attached to the guard-bar, and the solenoid N is connected by circuit-wires with the main-line rails at the point 3 preceding the switch, so that the entrance of a car upon the danger-section 3 4 operates as soon as the switch has been opened by the tread-lever O or solenoid P to detach the shifter D from the lever $c$ and draw-bar, and thus prevent any succeeding car from affecting the switch until the guard-bar $d$ is retracted. This is effected by the solenoid N', which is connected with separate insulated sections (marked 7) upon the main rails and upon the branch rails D', and the passage of a car when it reaches either of these sections retracts the guard-bar to the position shown in Fig. 21, which withdraws the wedges $d'$ from beneath the shifter D and also reverses the position of the switch by the contact of the slot $e$ with the pin $c'$.

Fig. 21 shows the parts in position at the close of this movement, which closes the switch again to the main rails, with the lock-bar $a$ locked by the latch $l^4$. The first movement of the draw-bar $b$ in either direction lifts the latch by the inclines $o'$ before moving the lock-bar $a$. It will be observed that the solenoid P, actuated by the car through the circuit connections $P^2$, is wholly independent of the tread-lever O and the shifter D in its operation of opening the switch $N^2$, and either of these agencies is thus capable of opening the switch if the other should fail. A double security is thus obtained for the movement of the switch if a car is to be shunted upon the branch track D', and the operation of the guard-bar prevents the switch from being moved if one car is succeeded so quickly by another as to prevent the complete shifting of the switch, so as to despatch the cars in different directions. Any accident to a second car by meeting this switch when partially opened or closed is thus wholly prevented.

The devices for opening and closing the gate J upon the branch tunnel C furnish another example of two agencies separately actuated for moving the appliance. The means for actuating this gate is shown in Fig. 1 with connections adapted to operate in the same manner as those connected with the gate M, (shown in Figs. 6 and 14,) where the gate is shown combined with a blower to form a so-called "accelerator," and Fig. 6 will serve to show the operation of any of the gates. For the gate J the movement of the gate-shifter is initiated by suitable track fixtures actuated by a car approaching the branch tunnel C. In Fig. 6 the gate-hinge is shown provided with an arm Q, coupled to a shifter-bar R, extended through pneumatic cylinders $r$ and $r'$ to be actuated by either of the pistons therein. Cylinder-valves $s$ $s'$ are shown for supplying the air to actuate the pistons, the crank of the valve $s$ being connected by a rod $p'$ to be pulled mechanically, as by connection to a tread-lever or piston, and the crank of the valve $s'$ being actuated, as shown in Figs. 9 and 10, by a slot-bar connected with armatures $t^2$ in solenoids $t$ $t'$. For this gate J the solenoids are shown in Fig. 1 connected with the insulated sections 3 and 4 of the track at opposite ends of the branch tunnel $c$, the solenoid $t$ operating when the car passes the section 3 to open the air-valve. The piston in the cylinder $r$ is thus actuated to open the gate. The armature $t^2$ and crank of valve $s'$ then remain stationary until the car reaches the section 4 beyond the gate, when the solenoid $t'$ is actuated and the valve closed and the cylinder $r$ vented to permit the gate J to close. The cylinder-valves $s$ and $s'$ operate when closed to vent the cylinders $r$ and $r'$ by suitable passages. The piston and cylinder $r$ are independently actuated by moving the valve-crank mechanically.

In Fig. 21 a wire $p'$ is shown extended from the shifter past the spring $p$, and such wire or a cord may be extended over suitable pulleys to the crank of the valve $s$, as shown in Fig. 6. A wire $p^2$ is extended beyond such crank to be connected with a tread-lever O' in the track adjacent to the section 4. By such connections the cylinder-valve $s$ may be opened and closed in the same manner as the cylinder-valve $s'$, but by mechanical agencies, so that if the electrical power should cease to operate the apparatus will not fail of actuation.

In Fig. 1 a pneumatic cylinder $r^2$ is shown with a valve $v$ adjacent to the rock-shaft $v'$, which is actuated by the tread-lever O for reciprocating the shifter D. The piston-rod of the pneumatic cylinder is shown connected with a cord $u$, extended over pulley $u'$ to the valve of the cylinder $r$ adjacent to the gate J, and a spring $v^2$ is applied to the piston-rod of the cylinder $r^2$ to draw the piston normally forward. The tread-lever O opens the valve $v$, which permits air to draw the piston in the cylinder $r^2$ backwardly to open the valve (represented at $s$ in Fig. 6) which controls one of the gate-opening shifters. This means for opening the valve $s$ is also mechanical and independent of all electrical connections. The switches F F' for the station-tracks E, E', and $E^2$ are shown in Fig. 2 provided with means for shifting each switch to a reverse position after a car V has passed over it, so that the cars are automatically switched alternately upon different tracks.

The shifter would in practice be made with a lock-bar and draw-bar, as described in connection with Fig. 21 for the switch $N^2$, as shown in Figs. 2 and 23, the draw-bar $b$ being connected detachably with the armature $b^2$ of two solenoids R and R'. Insulated sections 8 and 9 are shown upon the tracks E' and E² beyond their point of crossing and are connected separately to the solenoids R and R', so that the passage of the car over either of such sections operates such solenoid and reverses the previous position of the switch. A car passing to the arrester E² would when it reached the section 9 shift the switch to the section E', so that the succeeding car would pass on to the track E', where its contact with the section 8 would reverse the switch and throw it back to the track E². To safeguard each switch, the armature $b^2$ for the solenoids R and R' is shown in Figs. 23 and 24 attached to a shifter-bar D, carrying a stud $c'$ with notch upon one side. The draw-bar $b$ has a slot fitted to the stud and has knife-edge $b^4$ at one end fitted to the notch in the stud. The draw-bar is hinged to a lock-bar $a$, attached to the switch, and its slotted end can thus be lifted from the stud $c'$, toward which it is normally pressed by spring $p^4$. The guard-bar $d$ is mounted to carry a wedge $d^2$, fitted between the draw-bar and the shifter D, and is attached to the armature $d^3$ of a solenoid $D^2$, which is connected with the switch F.

When a car passes the switch, it energizes the solenoid $D^2$ and draws the wedge forward, which prevents the actuation of the switch F until the car leaves the danger-section.

If one car succeeds another closely upon the track G, the second car is prevented from colliding with a partially opened or closed switch, the only effect being that the two cars are shunted upon the tracks F' instead of one. The shifter for the switch F' is similarly safeguarded by a guard-bar and solenoids connected with the track-section 10 or 11. The normal operation of a car with either the switch F or F' to reverse the operation of such switch is thus prevented in case the car is succeeded so closely by another as to operate the guard-bar.

The devices so far described relate to the shunting of the cars from the main line or from any branch in the station, and corresponding safeguards are provided to prevent the despatch of any cars from the station into the main tunnel while any car is approaching or passing the junction of the inlet-track $D^2$ and the main track B. Such safeguards are maintained by the circuit connections (marked $P^3$) which extend from the point 1, (which in practice may be eight or ten hundred feet in advance of the inlet-track $D^2$,) so that a car entering the main tunnel may not be reached by a car moving rapidly over the danger-section embraced between the points 1 and 2. The despatch-chamber G (shown in Figs. 19 and 20) is provided with a downwardly-inclined track to carry the cars by gravity into the main tunnel and with an arrester or braking apparatus near the rails, which operates by contact with the bottom of the car or shoes thereon to stop any car which is running into such chamber. Such a chamber is provided with gates K and K' at opposite ends to introduce the cars without loss of air-current from the main tunnel, the arrester serving to catch the cars as they enter the chamber when the outer gate is open. The outer gate being then closed, the inner gate K' can be opened and the car despatched by withdrawing the arrester. The withdrawal of the arrester is preferably effected electrically by connections with the opposite ends of the danger-section, (marked, respectively, 1 and 2.)

The arrester will be described in detail in connection with Figs. 3 to 5 and is shown in Figs. 16 and 19 consisting of brake-bars S', tied together and sloped downwardly at the rear end to receive the car gradually. The bars are pressed normally upward by springs $S^4$, which are sufficient merely to lift the bars and their framing, and a bolt $k$ is provided to hold the arrester in an operative position. When the bolt is disengaged, the passage of an entering car presses the arrester down, so that the car can pass over it into the main tunnel without any material resistance. If the brake-bars of the arrester be held upward, the car is stopped and retained until the brake-bars are released, so that they can be pressed downward by the weight of the car. The release of the brake-bars thus automatically despatches the car. An armature having slot-bar $k'$ is shown fitted to solenoids $k^2$ and $k^3$, which are connected, respectively, by connections $P^3$ and $P^4$ with insulated portions of the main-line track at the points 1 and 2. (Shown in Fig. 1.) The bolt is shown connected by rock-shaft $m'$ with a crank $m^2$, which has a crank-pin fitted to the slot in the armature-bars, so as to be moved by the armature. The arrester being normally raised by the springs S', the passage of a car at the point 1 energizes the solenoid $k^2$ and moves the latch or bolt $k$ under the arrester. The armatures are given a greater movement than is required for the bolt, and the slot in the armature-bar permits the armature to acquire momentum before shifting the bolt.

The arrester remains locked or held in an operative position while the car in the main tunnel passes over the entire danger-section until it operates at the point 2 to energize the solenoid $k^3$, which reverses the movement of the bolt $k$ and retracts it from the arrester. A car may thus be standing in the despatch-chamber with the outer gate closed and the inner gate opened and be discharged automatically to the main tunnel as soon as the passing car has moved by the point 2. The gates K and K' are provided each with a pneumatic cylinder $r^6$ for opening it, and the cylinder-valves $s^6$ for supplying air to these two cylinders are provided with separate handle-bars $q$ and $q'$, by which an operator can cause either gate to be opened at pleasure, the gate K being open to introduce a car (shown at V) and then closed and the gate K' opened to permit the despatch of the car.

The accelerator, as shown in Figs. 14 and 15, includes a blower L, stationed at one side of the tunnel A and having its suction-passage $l$ connected with the tunnel at a sufficient distance from the discharge-passage $m$ to permit the insertion of the gate M between the two.

The accelerator is for convenience of illustration shown in Fig. 1 in the main tunnel A between the branch tracks D' and D², but may be located at any suitable point in the tunnel, especially upon upgrades, where the cars need the maximum of pressure to propel them against the resistance of the grade. The accelerator is preferably placed near stations for convenience of observation, regulation, and maintenance; but its gate requires no communication with a station and is not used for any cars going to a station, but only for cars passing in the main tunnel, the gate being opened automatically upon the approach of such cars and closed automatically after their passage. The means for opening and closing the gate is initiated by all cars passing the accelerator, the means described in connection with the gate J being suitable for moving the gate M, with which the same means is shown connected in Figs. 6, 14, and 15.

In the previous description the track-fixtures for opening the gate J were described; but in connection with the gate M an insulated section 13 is shown in Fig. 1 arranged in the track in the rear of the gate with electrical connection to the solenoid $t$ to operate the valve of the pneumatic cylinder $r'$ and electrical connections are shown extended from an insulated section 12 of the rails beyond the gate to the solenoid $t'$ to reverse the operation of the same valve and vent the pneumatic cylinder, and thus permit the gate to close when the car has passed.

To afford double security, mechanical connections to the valve of the cylinder $r$ are provided, the same as described for the cylinder $r$ in Fig. 6 when referring to the gate J.

Owing to the smallness of the scale, such connections are not wholly reproduced in Fig. 1 in connection with the gate M, but tread-levers O⁴ and P⁴ are shown to perform the same functions as the tread-levers O and O'. The mechanical and electrical means for operating the gate thus insure its opening and closing by one or the other of these agencies.

The accelerator is adapted to maintain the movement of cars in an endless circuit, and thus obviates the necessity of introducing air at the end of a tunnel. To facilitate the opening of gates in the main tunnel, where the air-current is active and produces a positive pressure upon one side of the gate, I furnish a passage at the side of the tunnel with openings at opposite sides of the gate and insert in such passage an air-plunger which passes a gate-lifter upon the negative or suction side of the gate. As the air-pressure is relatively small, an air-plunger is most readily made in the form of a flexible diaphragm $w$, (shown in Figs. 6 and 7,) connected by links with a gate-lifter in the form of a sliding bolt $w'$. The bolt is fitted to a socket on the suction side of the gate adjacent to its lower edge and is pressed normally toward the gate by the action of the diaphragm. The end of the bolt is preferably formed with a short coil or spring, as shown in Fig. 8, so that the gate may strike it when closing without concussion, and the diaphragm is so proportioned as to balance the chief part (or even more) of the air-pressure upon the gate, so that only its weight or a part of its weight need be lifted by the gate-shifting devices. It will be noticed that the diaphragm adapts itself to any variations of pressure which may exist upon the outer or positive side of the gate, so that when such pressure is diminished from any cause the action of the diaphragm to lift the gate is correspondingly diminished and the lifter is prevented from opening the gate, which is not intended to be its operation at any time, but only to balance the air-pressure or a part of the weight.

The automatic operation of any gate connected with the accelerator is greatly facilitated by thus neutralizing the air-pressure upon its positive side, as it enables the mechanism to operate more promptly and with less strain and resulting wear and tear when actuated automatically.

The arrester has been described in connection with the discharging-chamber G in Fig. 16, and the construction shown therein may be employed wherever an automatic operation of the arrester is desired, or the control of the arrester is governed by the movement of a car upon the track. The arrester may, however, be controlled by the operator, or may be controlled partly by the operator and partly by automatic devices, and an arrester of the latter character is shown in Figs. 3 to 5. In these figures the brake-bars S' are connected by tie-bars $s^2$, which fit between the stringers A² for the track-rails A. A skid $s^3$ is arranged to provide an incline at the rear end of the brake-bars to lead the shoes $t^3$ of the cars upon the same. The skid is pivoted at one end below the level of the track or brake-bars and rests at the other end upon the brake-bars, so as to rise and fall therewith. Lifter-arms $u^2$ are pivoted beneath the brake-bars and connected by a link $u^3$, and a spring U is connected with the lifter-arms to hold the brake-bars normally raised, so as to arrest the car. The forward ends of the brake-bars rest against an abutment U', against which they can move vertically when the lifter-arms $u^2$ are raised or lowered. A pneumatic cylinder V' is shown, having its piston-rod V² connected with the lifter-arms to lower the same in opposition to the spring U, and the air-supply pipe for the pneumatic cylinder is provided with a valve V³, having a handle V⁴, which when pushed down, as in Fig. 3, lets air into the cylinder and retracts the brake-bars. When pulled up, the valve vents the cylinder to the air. A latch $v^3$ engages one of the tie-bars $s^2$ when the brake-bars are permitted to descend by the operation of the air in the cylinder V', and the latch has a trip $v^4$, projected in the path of the car-body V, as shown in Fig. 3, which throws off the latch as the car leaves the arrester, so that the spring U may reset the arrester for any succeeding car. The latch has an arm connected by slotted link $v^5$ with a lever which operates the valve V³, and when the car pushes back the latch $v^3$ to release the arrester the link turns the valve to vent the pneumatic cylinder in case it has not already been done by the operator, thus removing the opposition to the spring U. The slot in link $v^5$ permits the operator to vent the cylinder at any time.

The arrester may be located in any part of the tunnel where required.

When inspection or repairs of the tunnel are required, the cars can all be removed into the various stations by concerted agreement; but in case any car through inadvertence remained in the tunnel it would, even if the motor power were stopped, continue to move with high velocity if on a descending grade, and arresters would, therefore, be placed in such grades which could be erected when required and by which any such car would be stopped.

It is obvious that when cars are ascending a grade if the air-current should be cut off by any means they would tend to run backwardly upon the grade and cause an accident if brought into collision with other cars or stationary objects. To prevent such accidents, I furnish one of the car-wheels 12 upon each car, as shown in Figs. 11 to 13, with a ratchet 13 and a pawl 14, pivoted upon the car-body and pressed normally into such ratchet by spring 15. The teeth of the ratchet are inclined to slip past the pawl when the car moves forwardly, but to engage the pawl if the movement of the car is reversed, and the car is thus prevented from running backwardly upon grades. Where a car thus fitted enters a station, it may be necessary to move it backward and forward, and I therefore provide the pawl with a bolt 16, extended through a bearing 17, with two sets of notches 18 of different depths upon its ends. The bolt has a button swiveled upon its end and provided with wings 19, adapted to fit the said notches. When the wings are set in the shallow notches, as shown in Fig. 13, the bolt is held outwardly and the pawl retracted from the ratchet; but when the wings are engaged in the deeper notches, as shown in Fig. 11, the pawl engages the ratchet.

An abutment-block 21 is provided at the side of the pawl to resist the thrust upon the same when the car moves backwardly. The wheels of cars for operation in a tunnel are preferably arranged between the sides of the car-body; but for convenience of illustration the car-wheel is shown outside of the body in Figs. 11 to 14. The relation of the wheel to the body is obviously immaterial to the operation of the ratchet.

I have provided nearly every appliance upon automatic railways with double means for effecting the safety of cars, and in addition to the ratchet upon the car-wheels I also provide upon all the downgrades of the system safety car-pockets, such as are shown in Figs. 1 and 22, extended backwardly down the grade. Such pocket consists of a short branch tunnel A³ at one side of the main tunnel A, having a track B³ therein connected with the main tunnel-track B by a switch-tongue B⁴, which is pressed very lightly against the main rails B by a spring A⁴. Such switch-point projects forwardly so that all cars moving forwardly, as represented by the car-axle and arrow $y^4$, open it automatically and with inappreciable resistance, owing to the lightness of the spring. In case the air-current fails and the ratchet or pawl upon a car gives out when it is moving up a grade it would descend backwardly until it reached one of the car-pockets, when it would be deflected into the same automatically by the spring switch-tongue B⁴.

The branch tracks entering the stations would be formed with an upgrade to aid in arresting the cars as they entered the station, and such safety car-pockets would be applied to such station branches, so that in the event of a car lacking sufficient speed to enter a station it would be pocketed, and thus prevented from collision with succeeding cars or backing down upon the main line and obstructing the same. Such car-pockets may be used at times to accommodate repair-cars and workmen who enter the tunnels for various purposes.

A car running into a closed pocket of this character would be arrested more or less by the cushioning of the air in the pocket, but may be provided with an arrester thereon at S, and would then be retained in the pocket until it was removed by an operator. The failure of the air-current would be known at other points in the car-circuit, and an inspection of the main tunnel would be necessary after such failure to discover the condition and location of the various cars, and the car-pockets could then be entered and cars removed therefrom and restored to the main tunnel to be propelled when the air-current was renewed.

The car-wheel ratchet and the safety car-pocket furnish a double protection to the cars when ascending grades, and either is capable of arresting the cars and preventing accident in case the other should fail, while it is altogether unlikely that both devices should fail at the same time. This is equally true of the double devices provided for actuating the various appliances of the automatic railway, as one of the devices may be operated mechanically and the other electrically, so that both are not at all likely to be disabled from the same cause or to be put out of operation at the same time.

To still further guard a pneumatic railway from accidents means is provided for detecting and indicating any considerable failure in the air-current, especially at important grades and between stations. Such means consists of an air-vane located in an open recess upon the wall of the tunnel and projected transversely to the receiving air-current and pressed normally by a light spring toward an electrical contact adapted to close a circuit and ring a bell or otherwise give an alarm in the nearest station. Such device is shown in Fig. 22, where the vane 20 is located in a recess 21 and provided with an arm 22 and a spring 23, which holds the vane normally extended transversely to the tunnel, but clear of the moving cars.

An electric circuit is connected with the arm 22 and with a contact-screw 24, against which the arm is pressed by the spring if the air-current fails to hold the vane extended. The spring is adjusted to the pressure normally required to operate the cars, and the circuit is shown extended to a bell 25 in the station, so as to ring the same if the air-current fails. The contact and spring can be adjusted to give the alarm before the air-current has wholly stopped and when it has diminished to a point which renders it at all inefficient, and the alarm enables the operators to ascertain the cause of the failure. The current would obviously fail in its normal power at any particular air-vane even when the power which created the current is fully maintained if a car should through any accident become blocked in the tunnel in the rear of such air-vane, as it would obstruct the movement of the air beyond the car.

From the above description it will be seen that the safeguards, or most of them, are of a general nature which can be connected with any moving appliance upon a railway to secure the operation of the same when required or to prevent the operation of the same if one car succeeds another too rapidly for such movement to be safely effected.

The accelerator-fan is preferably placed in or near a station for convenience of observation or regulation and general maintenance and, under certain conditions of grades, for speeding the cars, but should be placed at suitable intervals along the main tunnel wherever required to accelerate or maintain the air-current. It may be used as an exclusive means to propel cars, or it may be used in combination with cars moved by other motor power for maintaining the air-current which necessarily moves with the cars in a closed passage or tunnel.

Where cars are moved by other motive power than air, the application of an accelerator to the tunnel at intervals removes the resistance of the air from such cars, and thus greatly economizes the use of the other motive power and lightens the installation upon each car for propelling purposes.

The tunnel may obviously be double, making a continuous or return circuit, or it may be a single tube open at the ends or a succession of such single or double tubes provided with suitable inlets and outlets, so that the air is allowed to move and to be accelerated in its movements by the accelerator.

It is understood that this invention relates to wheeled cars which run upon rails, and such cars may obviously be propelled by a motor upon the car. Where such motor-cars—as, for instance, electric cars—are used, the accelerator may be employed to conjoin an electric surface system with a pneumatic tunnel system whenever required. The cars having electric motors to run upon surface tracks may then be run directly into a pneumatic tunnel and the propulsion assisted or replaced by the air-current which is furnished by the accelerators. The accelerators are also of great value in assisting cars up the grades in a tunnel and may be employed wherever electric cars are run through a tunnel to help such cars up the grade, and thus avoid the use of excessive motor power upon such cars.

Having thus set forth the nature of the invention, what is claimed herein is—

1. The combination, with the railway-track and a movable appliance, as a switch or gate, of two shifter devices operated automatically for shifting such appliance, and means actuated by the moving car for separately initiating the movement of such shifter devices, whereby the operation of either shifter device serves to move the said appliance.

2. The combination, with the railway-track and a movable appliance, as a switch or gate thereon, and a "danger-section" upon the track including such appliance, of two shifter devices operated automatically for shifting such appliance, and means actuated by the moving car when upon such "danger-section" for separately initiating the movement of the shifter devices, as and for the purpose set forth.

3. The combination, with the railway-track and a movable appliance, as a switch or gate, of two shifter devices for moving such appliance, said devices being operated by independent motor agencies, and means actuated by the moving car for separately initiating the movement of such shifter devices, whereby the shifter devices are preserved from simultaneous disability.

4. The combination, with the railway-track and a movable appliance, as a switch or gate, of a shifter-bar connected with such appliance, two shifter devices connected to the said bar, and means actuated by the moving car for separately initiating the movement of such shifter devices, whereby either device may operate the bar to shift the appliance as desired.

5. The combination, with the railway-track and a movable appliance, as a switch or gate, of a shifter-bar connected with such appliance, two shifter devices, as pneumatic pistons and cylinders arranged in tandem upon such bar, and means actuated by the moving car for separately initiating the movement of such shifter devices, whereby either device may operate the bar to shift the appliance as desired.

6. The combination, with the railway-track and a movable appliance, as a switch or gate, of two shifter devices operated automatically for shifting such appliance, mechanical means, as a pull-rod and tread-lever actuated by the moving car, for initiating the movement of one of the shifter devices, and electrical means, as a magnet, circuit, and contact operated by the car for initiating the movement of the other shifter device.

7. The combination, with the railway-track and a movable appliance, as a switch or gate, of two shifter devices comprising each a pneumatic cylinder with piston attached to the said appliance, air-valves for supplying the cylinders, and means actuated by the moving car for separately actuating the said air-valves, whereby either piston operates to shift the moving appliance.

8. The combination, with the railway-track and a movable appliance, as a switch or gate thereon, and a "danger-section" upon the track including such appliance, of two shifter devices operated automatically for shifting such appliance, means actuated by the moving car when upon such "danger-section" for separately initiating the movement of such shifting devices, and means actuated by the car upon its passage from such "danger-section" to reverse the operation of such shifter devices, whereby the car is safeguarded while on such "danger-section."

9. The combination, with the railway-track and a movable appliance, as a switch or gate thereon, and a "danger-section" upon the track including such appliance, of two shifter devices operated automatically for shifting such appliance, means actuated by the moving car when upon such "danger-section" for separately initiating the movement of such shifter devices, means for locking the shifter devices after moving the said appliance, and means actuated by the car upon its passage from such "danger-section" to unlock the shifter devices and reverse the operation of such devices, whereby the car is safeguarded while on such "danger-section."

10. The combination, with the railway-track and a movable appliance, as a switch or gate thereon, and a "danger-section" upon the track including such appliance, of a shifter-bar connected with such appliance, two shifter devices connected to the said bar, means actuated by the moving car when upon such "danger-section" for separately initiating the movement of such shifter devices, means for locking the shifter-bar after moving the said appliance, and means actuated by the car upon its passage from such "danger-section" to unlock the shifter-bar and reverse the operation of the shifter devices, whereby the car is safeguarded while on such "danger-section."

11. The combination, with the railway-track and a movable appliance, as a switch or gate thereon, of a shifter-bar connected with such appliance, a pneumatic cylinder and piston for moving such shifter-bar and appliance, a cylinder-valve for supplying such cylinder, an auxiliary pneumatic cylinder with auxiliary piston having its rod coupled by an extended connection to such cylinder-valve, and an auxiliary valve for supplying the auxiliary pneumatic cylinder, with means actuated by the moving car for opening said auxiliary valve, whereby the motion initiated by the car may be conveyed for a great distance by the energy of the auxiliary pneumatic piston.

12. The combination, with the railway-track and a movable appliance, as a switch or gate thereon, of a shifter-bar connected with such appliance, two pneumatic shifter-cylinders with pistons connected to such shifter-bar, separate air-valves for supplying the two shifter-cylinders, an auxiliary pneumatic cylinder with auxiliary piston having its rod coupled by an extended connection to one of such cylinder-valves, an auxiliary valve for the auxiliary cylinder, means actuated by the moving car for opening said auxiliary valve, and electrical means actuated separately by the moving car for operating the valve of the other shifter-cylinder, whereby the failure of either cylinder-valve does not prevent the shifter from operation.

13. In an automatic railway, the combination, with the main track and an open station adjacent thereto, of a branch track leading therein, several station-tracks connected with the branch track by rail-switches, and means actuated by a car when directed upon each of the station-tracks to automatically shift the switch of such station-track and direct any succeeding car to a different station-track.

14. In an automatic railway, the combination, with the main track and an open station adjacent thereto, of a branch track leading therein, several station-tracks connected with the branch track by rail-switches, an electrically-insulated "danger-section" embracing each of said switches, means actuated by the car when directed upon each of the station-tracks to safeguard or lock the switch from displacement while on the "danger-section," and means actuated by the car upon leaving each "danger-section" to automatically shift the switch of such station-track, to direct any succeeding car upon a different station-track.

15. In an automatic railway, the combination, with the main track and an open station adjacent thereto, of a branch track leading therein, several station-tracks connected with the branch track by rail-switches, an electrically-insulated "danger-section" embracing each of said switches, means operated by the entering cars for shifting the several switches and automatically directing the cars in succession to the different station-tracks, and electric mechanism actuated by each car, as it enters the "danger-section" of any station-track, for locking the switch to such station-track and safeguarding such car and switch until the car be removed from such "danger-section."

16. In an automatic railway, the combination, with a given section of the track-rails termed an "arrester-section," of an arrester comprising brake-bars held normally raised adjacent to the track-rails and inclined downwardly at the receiving end, a car-body having brake-shoes parallel with the track to engage such brake-bars, and means for lowering the brake-bars when the car is brought to rest.

17. In an automatic railway, the combination, with a main track and an open station adjacent thereto, and a branch track employed for receiving or despatching cars, of brake-bars upon the branch track held retractably adjacent to the track-rails to arrest the car by friction, a car-body having brake-shoes to engage such brake-bars, and means for retracting the brake-bars when the car is brought to rest, to permit the removal of the car from the arrester.

18. In an automatic railway, the combination, with the arrester track-section and a car-body having brake-shoes on the bottom parallel with the track, of brake-bars located adjacent to the track-rails and inclined downwardly at the receiving end and having a spring and connections for holding the brake-bars normally raised in the path of the brake-shoes, and means actuated at the pleasure of the operator for lowering the brake-bars in opposition to the spring.

19. In an automatic railway, the combination, with the arrester track-section and a car-body having brake-shoes on the bottom parallel with the track, of brake-bars located adjacent to the track-rails and inclined downwardly at the receiving end, means for holding the brake-bars normally raised in the path of the brake-shoes, a hand-lever actuated at the pleasure of the operator with means for lowering the brake-bars in opposition to the spring, a lock for the brake-bars when thus lowered, and a trip actuated by the car upon leaving the arrester, to release the brake-bars and reset them for operation.

20. In an automatic railway, the combination, with the arrester track-section and a car-body having brake-shoes on the bottom parallel with the track, of brake-shoes located adjacent to the track-rails and inclined downwardly at the receiving end and having a spring and connections for holding the brake-bars normally raised in the path of the brake-shoes, means actuated at the pleasure of the operator for lowering the brake-bars in opposition to the spring, and means actuated by the car when moved from such arrester track-section to remove the opposition to the spring and permit the brake-bars to rise again in the path of the brake-shoes.

21. In an automatic railway, the combination, with downwardly-inclined track-rails, of an arrester comprising brake-bars sustained retractably adjacent to the track-rails, a car-body with brake-shoes adapted to engage the brake-bars, and a bolt for holding the brake-bars normally raised to retain the car upon such arrester-section at the pleasure of the operator.

22. In an automatic railway, the combination, with a main track and an open station adjacent thereto, of a downwardly-inclined despatching-section for despatching cars to the main track, an arrester in such despatching-section comprising brake-bars sustained retractably adjacent to the track-rails, a bolt for holding the brake-bars normally raised, and means actuated by a main-line car (passing upon the main track) for automatically retracting the bolt to discharge the car from the despatching-section after the passage of such main-line car.

23. In an automatic railway, the combination, with a main track and an open station adjacent thereto, with a "danger-section" in the main track adjacent to such station, of a branch track having downwardly-inclined despatching-section for despatching cars to the main track, an arrester held retractably in the path of the cars upon such discharging-section, a bolt for holding the arrester in operative position, electric means adapted respectively to project and retract the said bolt, and connections operated respectively by cars entering and leaving the "danger-section," to project and retract the bolt, and thus hold the arrester in an operative position to arrest any car upon the despatch-section, until such "danger-section" be clear.

24. In an automatic railway, the combination, with the main tunnel and track and an inclined branch tunnel and branch track for despatching cars into the main tunnel, of a gate at the outer end of the branch tunnel and a gate within the branch tunnel forming a despatching-section between said gates, cylinders with pneumatic pistons for opening said gates independently, and hand-valves for admitting air to such cylinders for opening the gates at pleasure.

25. In an automatic railway, the combination, with the main tunnel and track and an inclined branch tunnel and branch track for despatching cars into the main tunnel, of gates upon the branch tunnel inclosing a discharging-section, an arrester located between the gates, means for holding the arrester in the path of the car to retain the car in such section, means for operating the gates independently, and means for releasing the arrester and discharging the car from such section.

26. In an automatic railway, the combination, with the main track and an open station adjacent thereto, of a branch track leading therein, several station-tracks connected with the branch track by rail-switches, a car-arrester upon each of the said station-tracks, and means actuated by a car, when directed upon each station-track, to automatically shift the switch from such station-track and direct the succeeding car to a different station-track.

27. In an automatic railway, the combination, with the main track and an open station adjacent thereto, of a branch track leading therein, several station-tracks connected therewith by rail-switches, the retractable car-arrester located in said station-tracks, means for holding such arrester normally projected in the path of the car, means actuated by a car when directed upon each station-track to automatically shift the switch from such station-track and direct the succeeding car to a different station-track, and means for retracting the arrester when the car is brought to rest on such station-track.

28. In an automatic railway, the combination, with the pneumatic tunnel having a gate therein, and an air-passage in the wall of the tunnel upon opposite sides of the gate, of an air-plunger inserted in such passage, a gate-lifter adapted to start the opening of the gate, and a connection from the air-plunger adapted to press such gate-lifter normally against the gate when closed, to partly or wholly balance the pressure of the air therein.

29. In an automatic railway, the combination, with the pneumatic tunnel having a gate therein with air-pressure upon one side and suction upon the opposite side, of a diaphragm located in the wall of the tunnel upon the suction side, a passage leading from the outer side of the diaphragm to the pressure side of the gate, a sliding bolt fitted to press upon the suction side of the gate, and connections from the diaphragm for pressing the bolt normally toward the gate when the diaphragm is pressed toward the tunnel.

30. The combination, with a tunnel having track-rails to carry wheeled cars, of the accelerator comprising a blower with connections for drawing air from and supplying it to the tunnel at adjacent points, and a back-pressure valve or gate held normally closed in the tunnel between said points by the action of the blower, and opened only for the passage of cars.

31. In an automatic railway, the accelerator for the air-current, consisting of a blower having its inlet and outlet connected with the tunnel at adjacent points, and a gate in the tunnel between such inlet and outlet, with mechanism operated by a car approaching the gate to automatically open such gate.

32. In an automatic railway, the accelerator for the air-current, consisting of a blower having its inlet and outlet connected with the tunnel at adjacent points, and a gate in the tunnel between such inlet and outlet, a "danger-section" upon the track including such gate, and means actuated by the car on entering and leaving such "danger-section," respectively, for opening and closing the said gate.

33. In an automatic railway, the accelerator for the air-current, consisting of a blower having its inlet and outlet connected with the tunnel at adjacent points, and a gate in the tunnel between such inlet and outlet, two shifter devices for opening the said gate, said devices being operated by separate motor agencies, a "danger-section" upon the track including such gate, and means actuated by the moving car for separately initiating the movement of such shifter devices upon entering the "danger-section," whereby the disability of one shifter does not disable the gate.

34. In an automatic railway, the accelerator for the air-current, consisting of a blower having its inlet and outlet connected with the tunnel at adjacent points, and a gate in the tunnel between such inlet and outlet, a "danger-section" upon the track including such gate, a gate-shifter with means actuated by the moving car when entering such "danger-section" for automatically moving the shifter, means for locking the shifter when the gate is opened, and means actuated by the car upon its passage from such "danger-section" to unlock the shifter and close the gate.

35. In an automatic railway, the combination, with the tunnel or pneumatic tube having track-rails to carry wheeled cars, of a safety car-pocket at the side of the same, the branch track in such pocket connected with the track in the tunnel, and a spring switch-tongue adapted to deflect into the car-pocket all cars moving in the tunnel toward such pocket.

36. In an automatic railway, the combination, with a tunnel or pneumatic tube having track-rails laid upon an ascending grade to carry wheeled cars, of a branch track having its switch-point extended up the grade and extended by the side of the tunnel, and a car-pocket formed about such branch track, such switch-point having a light spring to permit the passage of cars ascending the grade, and adapted to deflect into the pocket any cars moving backwardly on the grade.

37. In an automatic railway, the combination, with a tunnel or pneumatic tube having track-rails to carry wheeled cars, of a safety car-pocket at the side of the same, the branch track in such pocket connected with the track in the tunnel, and a spring switch-tongue adapted to deflect into the car-pocket all cars moving in the tunnel toward such pocket, and the car-pocket having an arrester adapted to make a frictional engagement with the car to bring the same to rest in the pocket.

38. In an automatic railway, the combination, with the pneumatic tunnel having track-rails to carry wheeled cars, of the current-indicator comprising an air-vane arranged in the path of the air-current, a spring to resist the air-pressure and draw the air-vane backwardly, and means connected with the air-vane for actuating an alarm when the vane is drawn by the spring from its normal position upon the diminution of the air-current.

39. In an automatic railway, the combination, with the pneumatic tunnel having track-rails to carry wheeled cars, of the current-indicator comprising an open recess in the side of the tunnel, an air-vane pivoted therein to stand normally in the path of the air-current, a spring to resist the air-pressure and draw the air-vane out of the current, and an electric circuit and alarm actuated thereby, with means connected to the air-vane for closing the circuit when the pressure diminishes and the spring moves the vane from its normal position.

In testimony whereof I have hereunto set my hand in the presence of two subscribing witnesses.

BENJAMIN F. CARPENTER.

Witnesses:
L. LEE,
THOMAS S. CRANE.